(12) United States Patent
Choi et al.

(10) Patent No.: US 11,394,065 B2
(45) Date of Patent: Jul. 19, 2022

(54) BATTERY MODULE WITH FLAME BLOCKING MEMBER

(71) Applicant: SK Innovation Co., Ltd., Seoul (KR)

(72) Inventors: Ha Neul Choi, Daejeon (KR); Hae Ryong Jeon, Daejeon (KR); Ha Chul Jeong, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 55 days.

(21) Appl. No.: 16/935,513

(22) Filed: Jul. 22, 2020

(65) Prior Publication Data

US 2021/0028517 A1 Jan. 28, 2021

(30) Foreign Application Priority Data

Jul. 23, 2019 (KR) .................. 10-2019-0088782

(51) Int. Cl.
*H01M 10/6554* (2014.01)
*H01M 10/658* (2014.01)
*H01M 10/613* (2014.01)

(52) U.S. Cl.
CPC ..... *H01M 10/6554* (2015.04); *H01M 10/613* (2015.04); *H01M 10/658* (2015.04)

(58) Field of Classification Search
CPC .......... H01M 10/6554; H01M 10/613; H01M 10/658
See application file for complete search history.

(56) References Cited

U.S. PATENT DOCUMENTS

| | | | | |
|---|---|---|---|---|
| 2015/0064540 | A1* | 3/2015 | Roh | H01M 10/0413 429/153 |
| 2015/0236386 | A1* | 8/2015 | Yang | H01M 50/24 429/120 |
| 2019/0280260 | A1* | 9/2019 | Shimizu | H01M 50/20 |
| 2019/0288355 | A1* | 9/2019 | An | H01M 10/6554 |

FOREIGN PATENT DOCUMENTS

| | | |
|---|---|---|
| KR | 1020130064969 A | 6/2013 |
| KR | 1020180005456 A | 1/2018 |

\* cited by examiner

*Primary Examiner* — Jimmy Vo
(74) *Attorney, Agent, or Firm* — The Webb Law Firm (57) ABSTRACT

A battery module, includes a battery cell stack in which a plurality of battery cells are stacked; and a heat dissipation plate coupled to one side of the battery cell stack to discharge heat generated in the battery cells externally, wherein the battery cell stack includes a first blocking member formed of an insulating material and disposed between the plurality of battery cells to provide a plurality of insulating spaces, wherein the plurality of battery cells are distributedly disposed in the plurality of insulating spaces.

15 Claims, 8 Drawing Sheets

BATTERY MODULE WITH FLAME BLOCKING MEMBER

CROSS-REFERENCE TO RELATED APPLICATION

This application claims priority to Korean Patent Application No. 10-2019-0088782 filed on Jul. 23, 2019, the disclosure of which is hereby incorporated by reference in its entirety.

BACKGROUND

1. Field

The present disclosure relates to a battery module.

2. Description of Related Art

Secondary batteries, unlike primary batteries, can be charged and discharged, and thus, secondary batteries can be applied to devices within various fields, such as digital cameras, cell phones, laptops, and hybrid vehicles. Such secondary batteries may include, for example, a nickel-cadmium battery, a nickel-metal hydride battery, a nickel-hydrogen battery, a lithium secondary battery, and the like.

Among these secondary batteries, many studies have been conducted into lithium secondary batteries having high energy density and discharge voltage. Recently, lithium secondary batteries have been manufactured as pouch-type battery cells with flexibility to be configured and used in the form of a module through the connection of a plurality of pieces.

On the other hand, when the battery module is used for an extended period of time, heat is generated by the battery, especially when charged, an internal temperature may rise rapidly, and the temperature rise of the battery may shorten a lifespan of the battery and deteriorate efficiency of the battery. In addition, ignition or explosion may occur in the worst case.

In the conventional case, battery cells accommodated therein are all disposed in one space. Accordingly, when a flame is generated in one battery cell, there is a problem that the flame may propagate easily to the other battery cells, such that the flame may spread.

Therefore, a battery module capable of suppressing the propagation of flame or heat to the other battery cells is required.

SUMMARY

An aspect of the present disclosure is to provide a battery module that can suppress the propagation of flame or heat to the other battery cells when the flame occurs in the battery cells.

According to an aspect of the present disclosure, a battery module includes: a battery cell stack in which a plurality of battery cells are stacked; and a heat dissipation plate coupled to one side of the battery cell stack, to discharge heat generated in the battery cells externally, wherein the battery cell stack includes: a first blocking member formed of an insulating material and disposed between a plurality of insulating spaces to provide a plurality of insulating spaces, wherein the plurality of battery cells are distributedly disposed in the plurality of insulating spaces.

In the present embodiment, the battery cell stack may further include a second blocking member disposed on both side surfaces of the first blocking member to form the insulating space, wherein an electrode lead of the battery cells may be disposed to be exposed to an outside of the second blocking member.

In the present embodiment, each of respective insulating spaces may be configured as an internal space formed by the first blocking member, the second blocking member, and the heat dissipation plate.

In the present embodiment, a heat transfer member disposed between the battery cell stack and the heat dissipation plate may be further included.

In the present embodiment, the heat transfer member may be formed of any one of thermal grease, a thermally conductive adhesive, and an epoxy resin.

In the present embodiment, a cooling device coupled to an outer surface of the heat dissipation plate may be further included.

In the present embodiment, the first blocking member may be formed of a single piece of member having ductility.

In the present embodiment, in the battery cell stack, the one battery cell may be disposed in the one heat insulating space.

In the present embodiment, a plurality of buffer pads disposed between the plurality of battery cells may be further included, and the first blocking member may be disposed to alternately encompass at least the one battery cell and the buffer pad.

In the present embodiment, the heat dissipation plate may include a lower plate disposed below the battery cell stack and an upper plate disposed above the battery cell stack.

In the present embodiment, at least one of the first blocking member and the second blocking member may be formed of a fiber fireproof insulating material.

In the present embodiment, at least one of the first blocking member and the second blocking member may be formed by applying a gel-type heat insulating material to a flexible thin film.

In the present embodiment, at least one of the first blocking member and the second blocking member may be formed of a rubber material containing expandable graphite.

In the present embodiment, at least one of the first blocking member and the second blocking member may be made of a rubber material including ceramic having thermal shielding performance.

In the present embodiment, at least one of the first blocking member and the second blocking member may be formed of ceramic wool having a flame retardant performance.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Prior the detailed description of the present disclosure, the terms or words in the present specification and claims should not constructed as limited to ordinary or dictionary meanings, and it should be construed as meaning and concept consistent with the technical idea of the present disclosure based on the principle that it can be properly defined as a concept of a term in order to explain the present disclosure in the best way. Therefore, the embodiments described in the present specification and the configurations shown in the drawings are merely the most preferred embodiments of the present disclosure, and are not intended to represent all of the technical ideas of the present disclosure. It should be understood that various equivalents and modifications may be substituted for them at the time of filing of the present application.

Hereinafter, exemplary embodiments of the present disclosure will be described in detail with reference to the accompanying drawings. Further, the detailed description of known functions and constructions that may obscure the gist of the present invention will be omitted. For the same reason, some of the elements in the accompanying drawings are exaggerated, omitted, or schematically shown, and the size of each element does not entirely reflect the actual size.

For example, in the present specification, terms "upper side", "lower side", "side surface", and the like, are represented based on the drawings and may be differently represented when directions of corresponding targets are changed.

Figure 1:
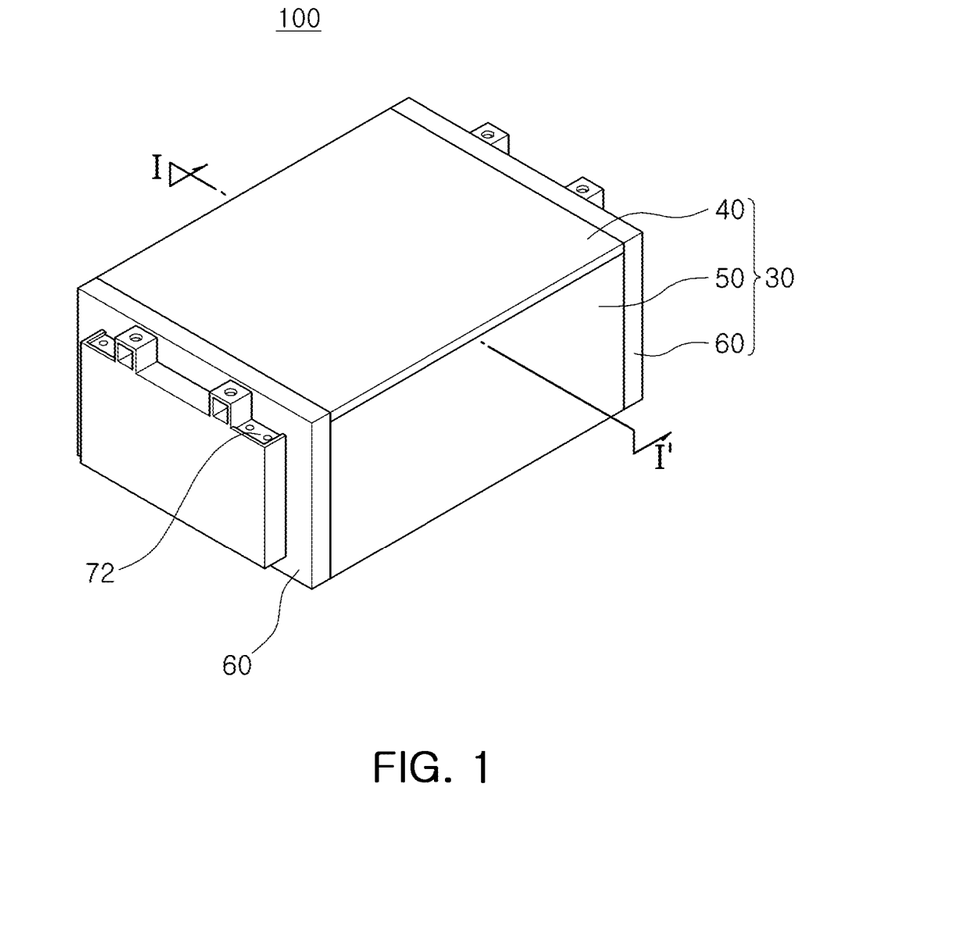
FIG. 1 is a perspective view schematically illustrating a battery module according to an embodiment of the present disclosure.
Figure 2:
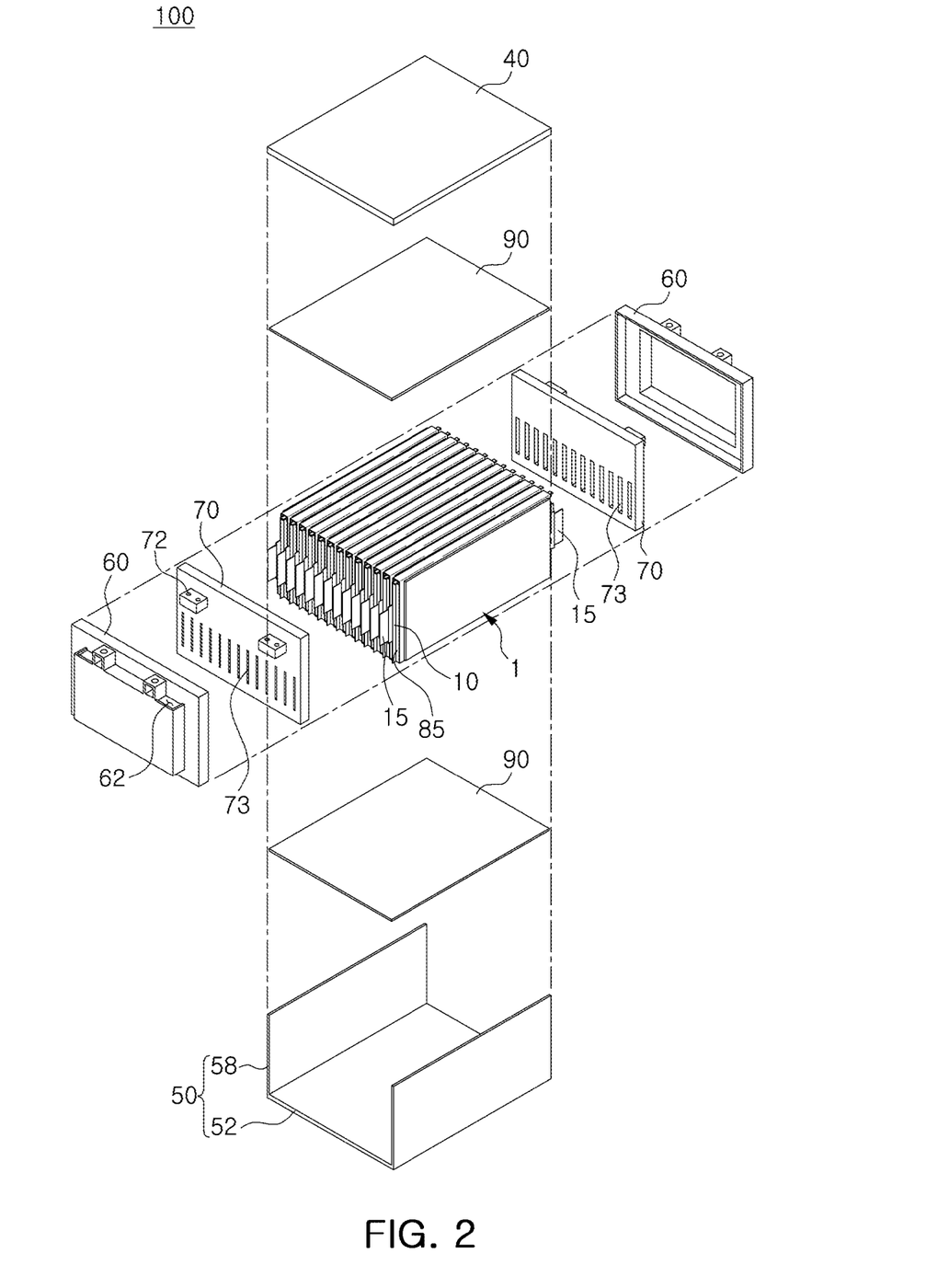
FIG. 2 is an exploded perspective view of the battery module shown in FIG. 1.
Figure 3:
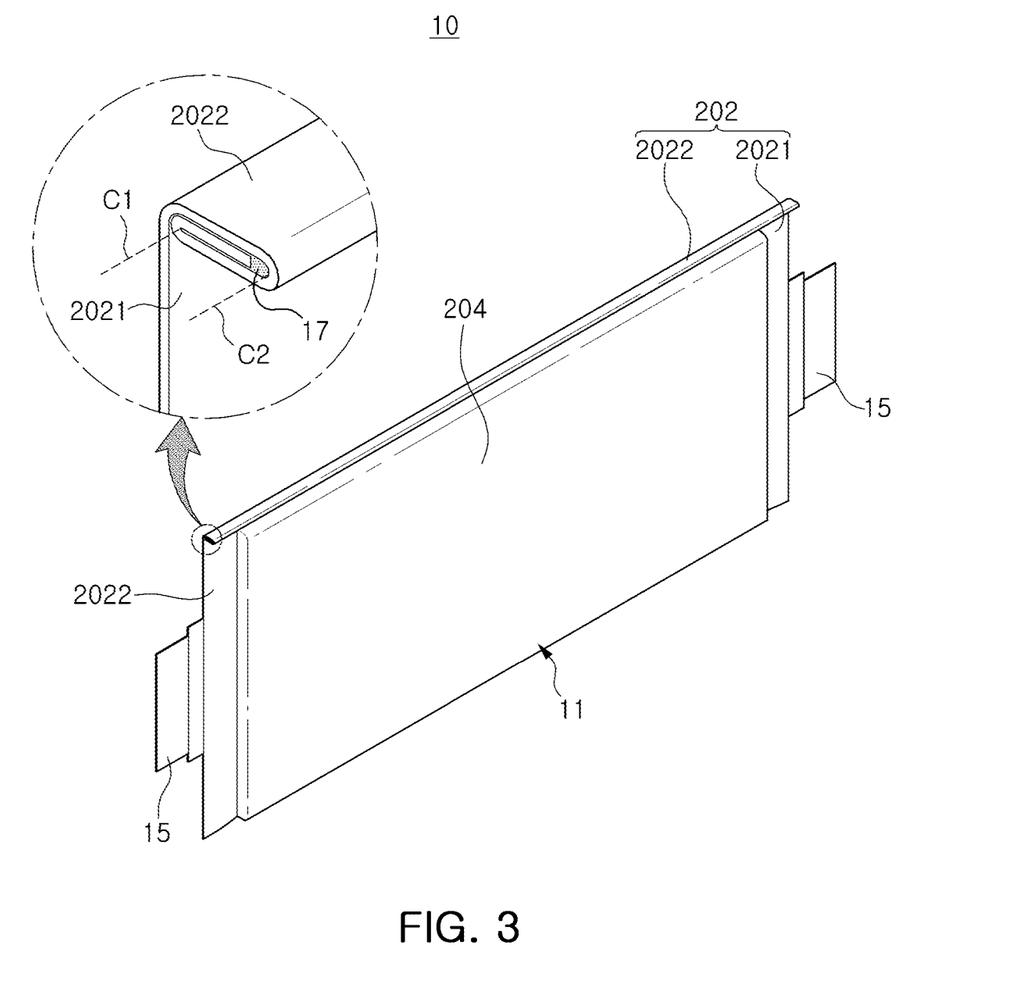
FIG. 3 is an enlarged perspective view of the battery cell of FIG. 2.

FIG. 1 is a perspective view schematically illustrating a battery module according to an embodiment of the present disclosure, FIG. 2 is an exploded perspective view of the battery module shown in FIG. 1, and FIG. 3 is an enlarged perspective view of the battery cell of FIG. 2.

Figure 4:
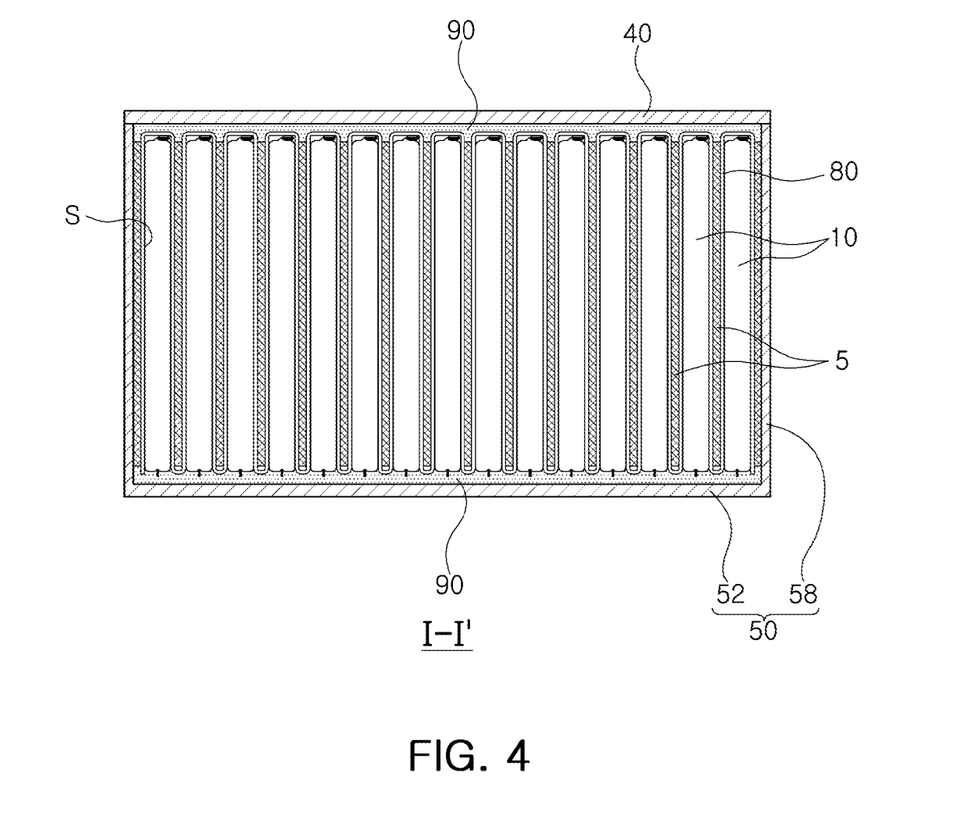
FIG. 4 is a cross-sectional view taken along line I-I' of FIG. 1.
Figure 5:
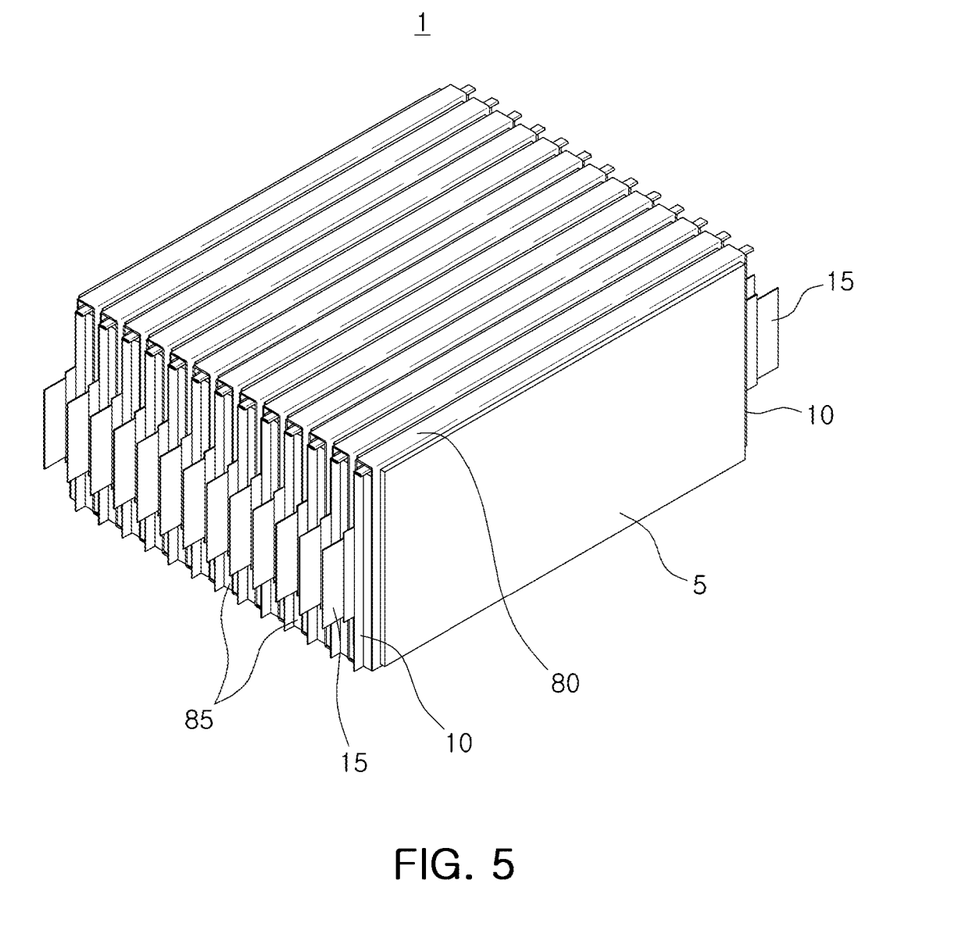
FIG. 5 is a partially exploded perspective view illustrating an enlarged battery cell stack of FIG. 2.
Figure 6:
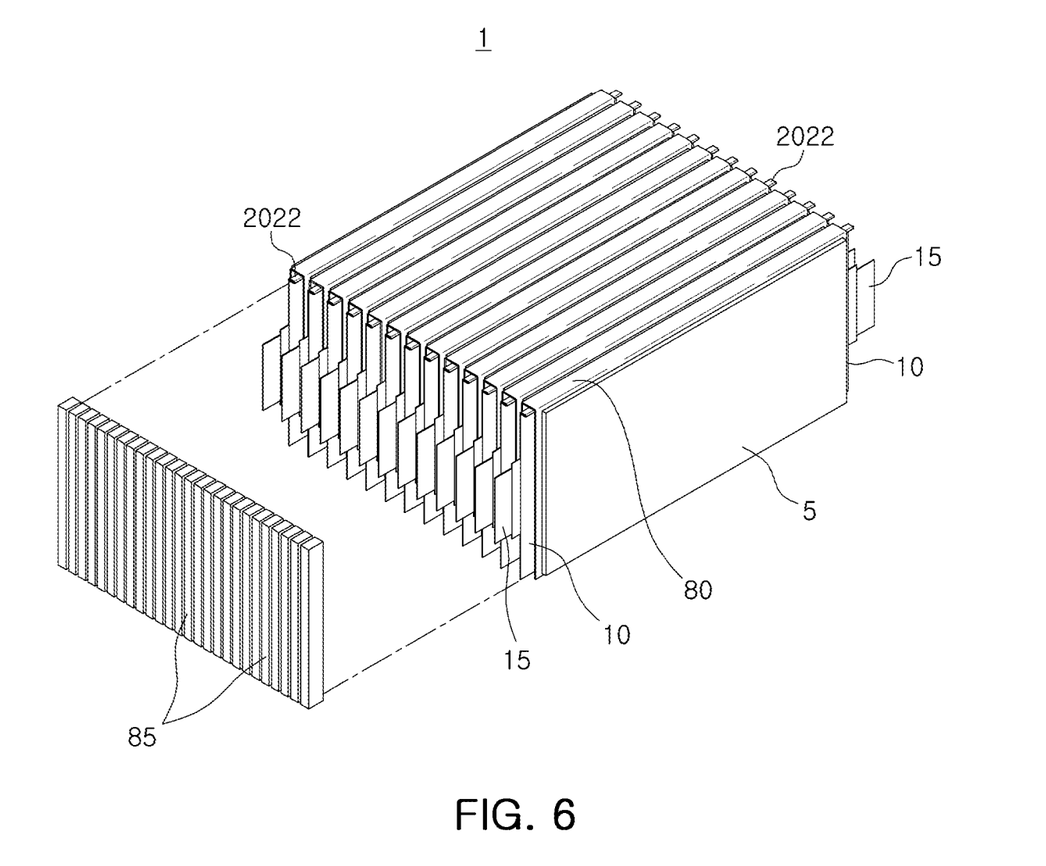
FIG. 6 is a partially exploded perspective view of FIG. 5.

In addition, FIG. 4 is a cross-sectional view taken along line I-I' of FIG. 1, FIG. 5 is an enlarged perspective view of the battery cell stack of FIG. 2, and FIG. 6 is a partially exploded perspective view of FIG. 5.

Referring to FIGS. 1 to 6, a battery module 100 of the present embodiment may include a battery cell stack 1, an insulating cover 70, a heat transfer member 90, and a case 30.

The battery cell stack 1 is formed by stacking a plurality of battery cells 10 shown in FIG. 3. In the present embodiment, the battery cells 10 are stacked in a left-right direction (or a horizontal direction). However, it can also be configured to be stacked in a vertical direction (up-down direction), as necessary.

Each of the battery cells 10 may be a pouch-type secondary battery, and may have a structure in which an electrode lead 15 protrudes externally.

The battery cell 10 may be configured in a form in which an electrode assembly (not shown) is accommodated in a pouch 11.

The electrode assembly includes a plurality of electrode plates and electrode tabs and is accommodated in the pouch 11. Here, the electrode plate may be composed of a positive electrode plate and a negative electrode plate, and the electrode assembly may be configured such that the positive electrode plate and the negative electrode plate are stacked so that a wide surface faces each other with a separator interposed therebetween.

The positive electrode plate and the negative electrode plate may be formed as a structure in which an active material slurry is applied to a current collector, and the slurry may be generally formed by stirring a granular active material, an auxiliary conductor, a binder, a plasticizer, and the like, in a state in which a solvent is added.

In addition, in the electrode assembly, a plurality of positive electrode plates and a plurality of negative electrode plates are stacked in a vertical direction. In this case, the electrode tabs may be provided on the plurality of anode plates and the plurality of cathode plates, respectively, and may be connected to the same electrode lead 15 by contacting each other with the same polarity.

In the present embodiment, the two electrode leads 15 are disposed to face each other in opposite directions.

The pouch 11 is formed in a container form to provide an internal space in which an electrode assembly and an electrolyte (not shown) are accommodated. In this case, some electrode leads 15 of the electrode assembly is exposed to the outside of the pouch 11.

The pouch 11 may be divided into a sealing portion 202 and a receiving portion 204.

The receiving portion 204 is formed in a container form to provide a quadrangular-shaped internal space. The electrode assembly and the electrolyte are accommodated in the internal space of the receiving portion 204.

The sealing portion 202 is a portion where a portion of the pouch 11 is bonded to seal a periphery of the receiving portion 204. Therefore, the sealing portion 202 is formed in a form of a flange extending outwardly from the receiving portion 204 formed in a container form, whereby the sealing portion 202 is disposed along an outer periphery of the receiving portion 204.

A heat fusion method may be used to bond the pouch 11, but is not limited thereto.

In addition, in the present embodiment, the sealing portion 202 may be divided into a first sealing portion 2021 in which the electrode lead 15 is disposed and a second sealing portion 2022 in which the electrode lead 15 is not disposed.

In the present embodiment, the pouch 11 is formed by forming a sheet of exterior material. More specifically, after forming by forming one or two storage portions on one exterior material, the exterior material is folded so that the storage units form one space (i.e., a receiving portion), thereby completing the pouch 11.

In the present embodiment, the receiving portion 204 is formed in a quadrangular shape. A sealing portion 202 formed by bonding an exterior material to the outer portion of the receiving portion 204 is provided. However, as described above, it is not necessary to form the sealing portion 202 on the surface where the exterior material is folded. Therefore, in the present embodiment, the sealing portion 202 is formed at the outer periphery of the receiving portion 204, and is provided on only three surfaces of the receiving portion 204. The sealing portion is not disposed on any one surface (a lower surface in FIG. 3) of the outer periphery of the receiving portion.

In the present embodiment, since the electrode lead 15 is disposed to face each other in opposite directions, the two electrode leads 15 are disposed on the sealing portion 202 formed on different sides. Therefore, the sealing portion 202 of the present embodiment is comprised of two first sealing portions 2021 in which the electrode lead 15 is disposed, and one second sealing portion 2022 in which the electrode lead 15 is not disposed.

In addition, the battery cell 10 of the present embodiment configures the sealing portion 202 in a form in which it is folded at least once, to increase bonding reliability of the sealing portion 202 and minimize an area of the sealing portion 202.

More specifically, the second sealing portion 2022 in which the electrode lead 15 is not disposed, among the sealing portions 202 according to the present embodiment, is folded twice and fixed by an adhesive member 17.

For example, the second sealing portion 2022 may be folded 180° along a first bending line C1 illustrated in FIG. 3, and then folded again along a second bending line C2 illustrated in FIG. 3.

In this case, an inside of the second sealing portion 2022 may be filled with an adhesive member 17, whereby the second sealing portion 2022 may be maintained in a form folded twice by the adhesive member 17. The adhesive member 17 may be formed of an adhesive having high thermal conductivity. For example, the adhesive member 17 may be formed of epoxy or silicon, but is not limited thereto.

In the present embodiment, the adhesive member 17 may be formed of a different material from a heat transfer member 90, which will be described later, but it is also possible to be formed of the same material as necessary.

The battery cell 10 configured as described above may be a nickel metal hydride (Ni-MH) battery or a lithium ion (Li-ion) battery capable of charging and discharging.

The battery cell 10 is vertically erected in the case 30, which will be described later, and stacked and disposed and in a left and right directions. A heat dissipation plate is disposed on at least one side of an upper side and a lower side of the battery cell stack 1 to discharge heat generated in the battery cells 10 externally.

In the present embodiment, the heat dissipation plate may include a second plate 40 disposed above the battery cell stack 1 and a lower plate 52 disposed below the battery cell stack 1.

At least one buffer pad 5 is disposed between the battery cells 10 disposed in a stack.

One or a plurality of buffer pads 5 are disposed between the receiving portions 204 of the battery cells 10.

The buffer pad 5 is compressed and elastically deformed when the specific battery cell 10 expands. Therefore, the expansion of the entire volume of the battery cell stack 1 can be suppressed. To this end, the buffer pad 5 may be made of polyurethane foam, but is not limited thereto.

In addition, the battery cell stack 1 according to the present embodiment includes a blocking member.

The blocking member of the present embodiment may include a first blocking member 80 and a second blocking member 85.

The first blocking member 80 is composed of a single piece of member having ductility, and is disposed in a zigzag form as shown in FIG. 4 to provide a plurality of insulating spaces S in which each of the respective battery cells 10 are disposed.

When a flame occurs in any one battery cell 10, the first blocking member 80 is provided to block the propagation of flame or heat caused by the flame to the other battery cells. Therefore, in the present embodiment, the respective insulating spaces S are isolated from each other as much as possible.

The plurality of battery cells 10 are distributedly disposed in the above-described plurality of insulating spaces S.

In addition, in the present embodiment, the first blocking member 80 is disposed in a form that alternately encompasses the battery cell 10 and the buffer pad 5. Accordingly, the first blocking member 80 is disposed only on a flat surface of the receiving portion 204 of the battery cells 10 and a side in which the second sealing portion 2022 is disposed, as shown in FIG. 4), and is not disposed on a lower portion of the receiving portion 204.

Meanwhile, the lower surface of the receiving portion 204 is configured to contact the lower plate 52 through a heat transfer member 90. Therefore, even if the first blocking member 80 is not disposed on the lower surface of the receiving portion 204, it is possible to block the propagation of the flame to the lower portion of the receiving portion 204 by the lower plate 52 and the heat transfer member 90.

As described above, the first blocking member 80 may be configured as a single piece of member. Therefore, when only the first blocking member 80 is provided, flames can be propagated to both side surfaces of the first blocking member 80 in which the electrode lead 15 of the battery cell 10 is disposed.

Accordingly, as illustrated in FIGS. 5 and 6, a second blocking member 85 is disposed on a side surface on which (the electrode lead 15 is disposed.

The second blocking member 85 is disposed on the side of the first sealing portion 2021 on which the electrode lead 15 is disposed, and may be disposed in a form of filling a space between the two first sealing portions 2021 or a space between the first sealing portion and the first blocking member 80.

Therefore, the second blocking member 85 may be formed in various forms as long as it can be filled in the above-described space. In the present embodiment, the second blocking member 85 is formed in a shape of a square rod. However, the present disclosure is not limited thereto, and various modifications are possible, such as forming in a form of a rod having a polygonal or circular cross-section, or forming a single structure having a shape that can fill the above-described entire space.

In addition, in the present embodiment, a case in which a portion of the first sealing portion 2021 is configured to be exposed to the outside of the second blocking member 85 is provided as an example, but is not limited thereto, and if necessary, it is also possible to configure the entire first sealing portion 2021 so as not to be exposed to the outside of the second blocking member 85.

An upper end of the second blocking member 85 may be configured such that at least a portion thereof contact the first blocking member 80. In addition, a lower end of the second blocking member 85 may be configured to contact a lower plate via the heat transfer member 90.

Accordingly, each of the respective insulating spaces S is formed by the first blocking member 80, the second blocking member 85, and the lower plate 52, and is not directly connected to each other. The entire receiving portion 204 of the battery cell 10 is disposed in the above-described insulating space S.

Since the blocking members 80 and 85 need to block the propagation of the flame, the blocking members 80 and 85 may be formed of a flame retardant material, a non-combustible material, or a fireproof insulating material. For example, the blocking members 80 and 85 may be formed of a material capable of performing fireproof/insulation because it contains ceramic, a pad-type material made by applying a gel-type insulating material containing sodium silicate on a thin film, or a fiber fireproof insulating material such as a ceramic wool or glass fiber having a flame retardant performance.

In addition, the blocking members 80 and 85 may be composed of a rubber material containing ceramic having a thermal shielding performance, or may be configured to form a rubber material containing expandable graphite to rapidly expand the graphite when exposed to heat to form an insulating layer.

Through such a configuration, the battery module 100 according to the present embodiment is distributedly disposed in the insulating spaces S in which the respective battery cells 10 are isolated from each other. Therefore, even if a flame occurs in any one of the battery cells 10, it is possible to prevent the flame from propagating to the battery cells 10 disposed in another insulating space S. In addition, a rapid heat transfer to other battery cells 10 can also be suppressed.

A case 30 defines an external shape of the battery module 100, and is disposed outside of the plurality of battery cells 10 to protect the battery cells 10 from an external environment. At the same time, the case 30 of the present embodiment also functions as a cooling member of the battery module.

The case 30 of the present embodiment may include a first plate 50 disposed on one side of the battery cell stack 1, a second plate 40 disposed on the other side of the battery cells 10, and a side surface cover 60 disposed on a side surface on which the electrode leads 15 of the battery cells 10 are disposed.

The first plate 50 may include a lower plate 52 disposed on a lower portion of the battery cell 10 and supporting a lower surface of the battery cells 10, and a side plate 58 supporting a side surface on which the receiving portion 204 of the battery cells 10 are disposed. However, it is also possible to configure the side plate 58 and the lower plate 52 as independent components, if necessary.

The side plate 58 is formed to extend from both sides of the lower plate 52, and is disposed side surface of the battery cell stack 1 stacked and disposed in left and right directions to support the receiving portion 204 of the battery cells 10.

To firmly support the battery cell 10, the side plate 58 can be configured to directly contact the receiving portion 204 of the battery cell 10. However, the present disclosure is not limited thereto, and various modifications can be made as necessary, such as interposing a heat dissipation pad, a buffer pad 5, or the like, between the side plate 58 and the receiving portion 204.

The first plate 50 configured as described above is made of a material having high thermal conductivity such as metal. For example, the first plate 50 may be made of aluminum. However, the present disclosure is not limited thereto, and various materials may be used as long as the material has similar strength and thermal conductivity even if it is not metal.

The second plate 40 (or an upper plate) is disposed on an upper portion of the battery cell 10 and is coupled to the upper surface of the battery cells 10. In addition, the second plate 40 is fastened to an upper end of the side plate 58 of the first plate 50. Therefore, when the second plate 40 is fastened to the first plate 50, the second plate 40 and the first plate 50 have a shape of a hollow tubular member.

Like the first plate 50, the second plate 40 is made of a material having high thermal conductivity such as metal. The second plate 40 may be made of aluminum. However, the present disclosure is not limited thereto, and various materials may be used as long as the material has similar strength and thermal conductivity even if it is not metal.

The first plate 50 and the second plate 40 may be combined by welding, or the like. However, the present disclosure is not limited thereto, and various modifications are possible, such as combining by a sliding method or by using a fixing member such as a bolt or a screw.

A heat transfer member 90 may be filled in at least one of between the battery cells 10 and the first plate 50 and between the battery cells 10 and the second plate 40.

The heat transfer member 90 rapidly transfers heat generated in the battery cell 10 to the case 30. To this end, the heat transfer member 90 is made of a material having high thermal conductivity. For example, the heat transfer member 90 may be formed of any one of a thermal grease, a thermal adhesive, an epoxy resin, and a heat dissipation pad, but is not limited thereto.

The heat transfer member 90 may be disposed on an inner surface of the case 30 in a form of a pad, or may be formed by applying it to the inner surface of the case 30 in a liquid or gel state.

The heat transfer member 90 of the present embodiment has a high insulating property, for example, a material having a dielectric strength in a range of 10 to 30 KV/mm may be used.

Accordingly, the battery module 100 according to the present embodiment, even if insulation is partially destroyed in the battery cell 10, insulation between the battery cell 10 and the case 30 may be maintained by the heat transfer member 90 disposed at a periphery of the battery cell 10.

In addition, since the heat transfer member 90 is disposed in a form of filling a space between the battery cells 10 and the case 30, overall rigidity of the battery module 100 is also reinforced.

In the present embodiment, a case in which the heat transfer member 90 is disposed on both upper and lower surfaces of the battery cell 10 is provided as an example. However, the configuration of the present disclosure is not limited thereto, and it is possible to omit the heat transfer member 90 as necessary, or to dispose the heat transfer member 90 only in one of the upper and lower portions of the battery cell 10. In addition, a heat transfer member 90 may be additionally disposed between the battery cell stack 1 and a side plate 58.

The battery module 100 of the present embodiment functions as a plate (hereinafter, a heat dissipation plate) discharging heat to the outside through the lower plate 52 and the second plate 40. Therefore, even if the blocking members 80 and 85 having low thermal conductivity are disposed between the battery cells 10, heat generated in the battery cell 10 is smoothly discharged to the outside through the heat dissipation plate described above.

Meanwhile, referring to FIG. 4, a heat transfer member 90 is interposed between the lower plate 52 and the battery cell stack 1, and thus the lower plate 52 and the battery cell stack 1 are disposed to be spaced apart by a predetermined distance by the heat transfer member 90. In this case, it can be understood that the insulating space S is formed by the first blocking member 80, the second blocking member 85, and the heat transfer member 90. However, the configuration of the present disclosure is not limited thereto. For example, when the lower plate 52 is coupled to contact with the battery cell stack 1, and configured to fill the heat transfer member 90 in a space between the lower plate 52 and the battery cell stack 1, the insulating space S is formed by the first blocking member 80, the second blocking member 85, and the lower plate 52. As such, one side of the insulating space S may be closed by at least one of a heat dissipation plate or a heat transfer member 90.

Aside surface cover 60 is respectively coupled to both side surfaces on which the electrode leads 15 of the battery cells 10 are disposed.

As illustrated in FIG. 2, the side surface cover 60 is coupled to the first plate 50 and the second plate 40, to complete an appearance of the battery module 100 together with the first plate 50 and the second plate 40.

The side surface cover 60 may be formed of an insulating material such as a resin, and may include a through hole 62 for exposing a connection terminal 72 of an insulating cover 70 to be described later.

The side surface cover 60 may be coupled to the first plate 50 and the second plate 40 through a fixing member such as a screw or bolt. However, it is not limited thereto.

An insulating cover 70 may be interposed between the side surface cover 60 and the battery cell stack 1.

The insulating cover 70 is coupled to one surface on which the electrode leads 15 of the battery cells 10 are disposed. Therefore, the above-described second blocking member 85 may be disposed in a form of filling a space between the insulating cover 70 and the battery cell stack 1.

The electrode leads 15 penetrate the insulating cover 70 and are interconnected from the outside of the insulating cover 70. To this end, the insulating cover 70 may be provided with a plurality of through holes 73 in which the electrode leads 15 are inserted and disposed.

In addition, the insulating cover 70 may be provided with a connection terminal 72 for connection with the outside. Therefore, the battery cells 10 are electrically connected to the outside through the connection terminal 72, and to this end, the electrode lead 15 may be electrically connected to the connection terminal 72 through a circuit wiring (not shown) provided in the insulating cover 70.

The connection terminal 72 is exposed externally through the through hole 62 formed in the side surface cover 60. Therefore, the through hole 62 of the side surface cover 60 is formed in a size corresponding to the size and shape of the connection terminal 72.

In addition, the insulating cover 70 may include a circuit board (for example, a PCB) and a plurality of electronic devices mounted on the circuit board, through which a function of sensing the voltage of the battery cell 10 may be performed.

The battery module according to the present embodiment configured as described above can prevent other battery cells from being directly exposed to the flame even if a flame is generated in any one battery cell. It can also suppress a rapid transfer of heat to other battery cells. Therefore, diffusion of flame or heat can be suppressed.

In addition, since the blocking member is made of a material having low electrical conductivity, it is possible to increase insulating reliability between the case and the battery cell, and provides an advantage that a separate member (such as an insulating material or insulating coating) is not required for insulation.

Further, when a blocking member having a suitable compression load is used, since the blocking member can perform a conventional compression pad function, the number of parts can be minimized by omitting the compression pad.

Meanwhile, the present disclosure is not limited to the above-described embodiment, and various modifications are possible.

Figure 7:
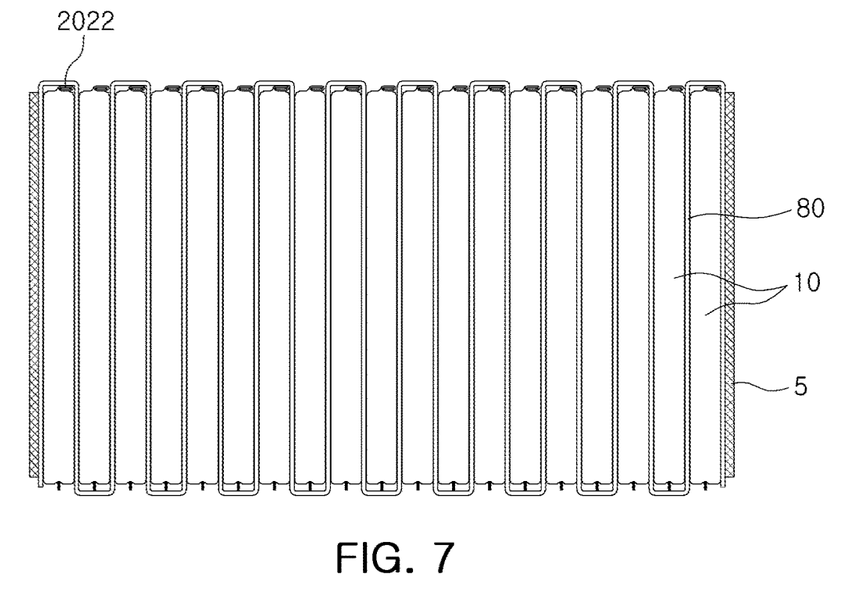
FIG. 7 is a cross-sectional view of a battery cell stack according to another embodiment of the present disclosure.

FIG. 7 is a cross-sectional view of a battery cell stack according to another embodiment of the present disclosure, and shows a cross-section along I-I' of FIG. 1. In addition, FIG. 8 is a cross-sectional view of the battery module including the battery cell stack shown in FIG. 7.

Figure 8:
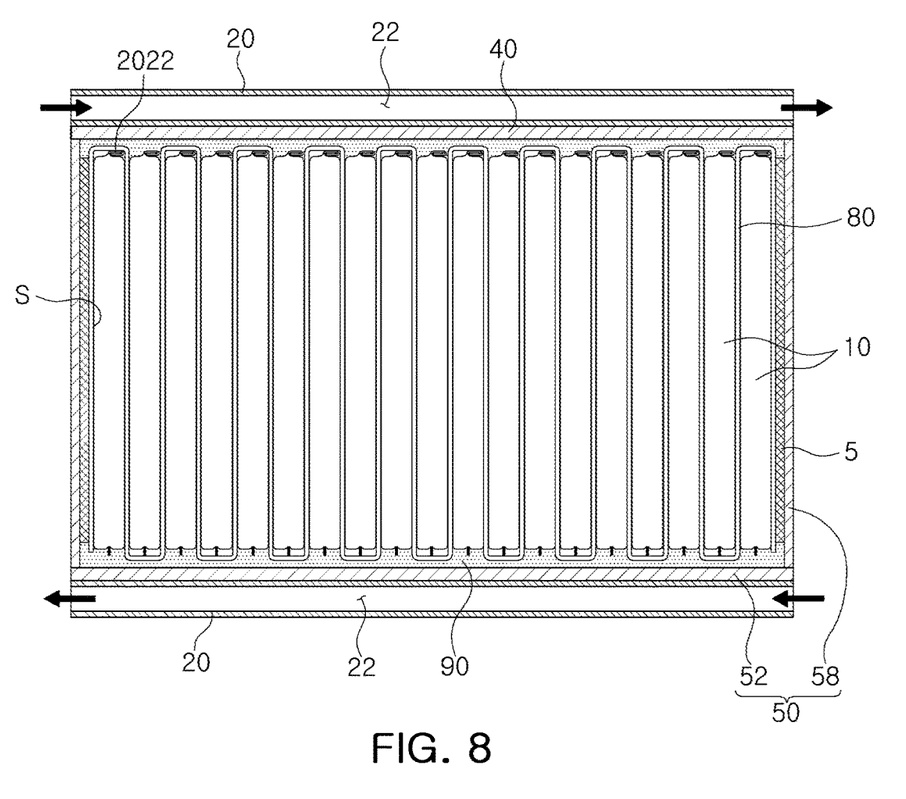
FIG. 8 is a cross-sectional view of a battery module including the battery cell stack shown in FIG. 7.

Referring to FIGS. 7 and 8, in the battery cell stack according to the present embodiment, a buffer pad 5 is not disposed between the battery cells 10, and a first blocking member 80 is disposed to alternately encompass the battery cells 10 in a zigzag form. Accordingly, in any one battery cell 10, the first blocking member 80 is disposed on a surface on which a second sealing portion 2022 is disposed, and a lower surface thereof is closed by a heat dissipation plate (or a heat transfer member), and in the other battery cell 10 disposed next to the battery cell 10 in a stack, the first blocking member 80 is disposed on a lower surface of a receiving portion 204 and a surface on which the second sealing portion 2022 is disposed is closed by a heat dissipation plate (or a heat transfer member).

In addition, in the present embodiment, the first blocking member 80 is a member having a suitable compressive load. Accordingly, since the first blocking member 80 can function as a buffer pad, the number of parts can be minimized by omitting the buffer pad.

In addition, since heat generated in each battery cell 10 is distributed to the second plate (40 in FIG. 4) and the lower plate (52 in FIG. 4), the heat dissipation effect can be enhanced.

Meanwhile, the battery module of the present disclosure may include at least one cooling device.

In the case of a battery module having the battery cell stack shown in FIG. 7, as shown in FIG. 8, the cooling device 20 may be coupled to the lower surface of the first plate 50 and the upper surface of the second plate 40, respectively.

The battery cell stack of FIG. 7 is disposed such that a portion of the battery cell faces the first plate 50 and the other portion thereof faces the second plate 40.

Therefore, for effective heat dissipation, the cooling device 20 is coupled to both the lower surface of the first plate 50 and the upper surface of the second plate 40.

The cooling device may be applied to a battery module according to another embodiment. In the case of the embodiments shown in FIG. 4 or FIG. 8 to be described later, since the first blocking member 80 is disposed between the battery cells 10 and the second plate 40, a flow of heat is blocked by the first blocking member 80. Therefore, heat dissipation is difficult through the second plate 40.

On the other hand, since the first blocking member 80 is not disposed between a bottom surface of the battery cells 10 and the first plate 50, heat can be smoothly discharged through the first plate 50. Therefore, in the case of the battery module according to the embodiments illustrated in FIG. 4 or FIG. 9, the cooling device 20 may be disposed only on the lower surface of the first plate 50.

However, the configuration of the present disclosure is not limited thereto, and the cooling device may be selectively disposed at various positions as necessary.

In the present embodiment, the cooling device 20 is a water-cooled cooling device having a cooling passage 22 therein. However, the configuration of the present disclosure is not limited thereto, and it is also possible to apply an air-cooled cooling device.

The cooling device 20 may be integrally coupled to the case 30 and included in the battery module. In the present embodiment, the cooling device 20 is coupled to the second plate 40 disposed above the battery cell 10 and the lower plate 52 disposed below the battery cell 10, respectively. However, the present disclosure is not limited thereto, and the cooling device may be disposed in a device or structure in which the battery module is mounted, separately from the battery module.

Also, although not shown, a thermal pad may be disposed between the first plate 50 or the second plate 40 and the cooling device 20 for an effective heat transfer.

Figure 9:
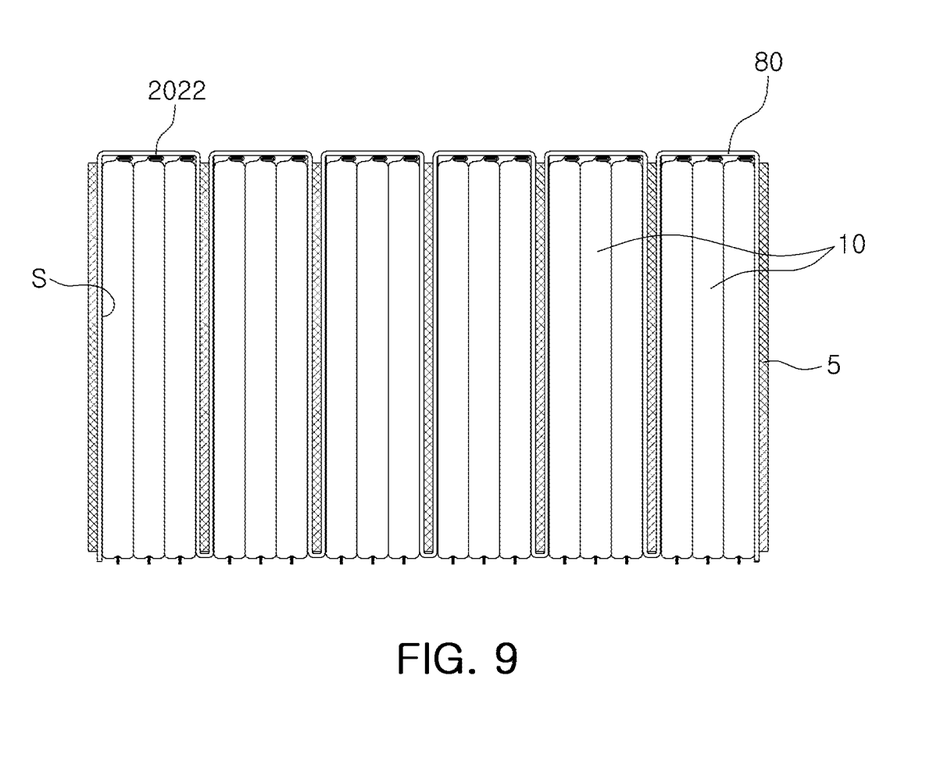
FIG. 9 is a cross-sectional view of a battery cell stack according to another embodiment of the present disclosure.

FIG. 9 is a cross-sectional view of a battery cell stack according to another embodiment of the present disclosure, and illustrates a cross-section along I-I' of FIG. 1.

Referring to FIG. 8, in the battery cell stack of the present embodiment, a plurality of battery cells 10 are disposed in one insulating space S.

In the present embodiment, a case in which three battery cells 10 are disposed in one insulating space S is provided as an example, but is not limited thereto.

When the battery cell stack is formed as described above, since an amount of the first blocking member 80 disposed between the battery cells 10 may be reduced, an overall volume of the battery cell stack may be reduced.

As set forth above, a battery module according to an embodiment of the present disclosure is disposed in a heat insulating space in which battery cells are independent. Therefore, even if a flame occurs in one battery cell, it is possible to prevent other battery cells from being directly exposed to the flame. In addition, it can also suppress a rapid transfer of heat to other battery cells.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

For example, in the above-described embodiment, a case in which the cooling device is disposed outside of the first plate and the second plate is provided as an example, but various modifications such as cases in which the cooling device is disposed inside the first plate and the second plate, or the first plate and the second plate include a cooling passage, are possible.

In addition, respective embodiments may be implemented in combination with each other.

While example embodiments have been shown and described above, it will be apparent to those skilled in the art that modifications and variations could be made without departing from the scope of the present inventive concept as defined by the appended claims.

What is claimed is:

1. A battery module, comprising:
a battery cell stack in which a plurality of pouch-type battery cells are stacked; and
a heat dissipation plate coupled to one side of the battery cell stack to discharge heat generated in the battery cells externally,
wherein the battery cell stack comprises a first blocking member including a thermal insulating material and disposed in a zigzag form, to provide a plurality of thermally insulated spaces,
wherein the first blocking member is disposed to encompass at least one surface of each pouch-type battery, and
wherein the plurality of pouch-type battery cells are distributedly disposed in the plurality thermally insulated spaces.

2. The battery module of claim 1, wherein the battery cell stack further comprises a second blocking member disposed on both side surfaces of the first blocking member to form the plurality of thermally insulated spaces,
wherein electrode leads of the plurality of pouch-type battery cells are disposed to be exposed to an outside of the second blocking member.

3. The battery module of claim 2, wherein each of the plurality of thermally insulated spaces is comprised of an internal space formed by the first blocking member, the second blocking member, and the heat dissipation plate.

4. The battery module of claim 3, further comprising a heat transfer member disposed between the battery cell stack and the heat dissipation plate.

5. The battery module of claim 4, wherein the heat transfer member includes any one of thermal grease, a thermally conductive adhesive, and an epoxy resin.

6. The battery module of claim 1, further comprising a cooling device coupled to an outer surface of the heat dissipation plate.

7. The battery module of claim 2, wherein the first blocking member is formed of a single piece of member having ductility.

8. The battery module of claim 1, wherein in the battery cell stack, the one pouch-type battery cell is disposed in the one thermally insulated space.

9. The battery module of claim 1, further comprising a plurality of buffer pads disposed between the plurality of pouch-type battery cells,
wherein the first blocking member is disposed in a form that alternately encompasses the at least one pouch-type battery cell and the buffer pad.

10. The battery module of claim 9, wherein the heat dissipation plate comprises a lower plate disposed below the battery cell stack and an upper plate disposed above the battery cell stack.

11. The battery module of claim 2, wherein at least one of the first blocking member and the second blocking member includes a fireproof insulating material.

12. The battery module of claim 2, wherein at least one of the first blocking member and the second blocking member is formed by applying a gel-type insulating material to a flexible thin film.

13. The battery module of claim 2, wherein at least one of the first blocking member and the second blocking member includes a rubber material containing expandable graphite.

14. The battery module of claim 2, wherein at least one of the first blocking member and the second blocking member is made of a rubber material including ceramic having a thermal shielding performance.

15. The battery module of claim 2, wherein at least one of the first blocking member and the second blocking member includes ceramic wool having a flame retardant performance.

* * * * *

UNITED STATES PATENT AND TRADEMARK OFFICE
CERTIFICATE OF CORRECTION

| | |
|---|---|
| PATENT NO. | : 11,394,065 B2 |
| APPLICATION NO. | : 16/935513 |
| DATED | : July 19, 2022 |
| INVENTOR(S) | : Ha Neul Choi et al. |

It is certified that error appears in the above-identified patent and that said Letters Patent is hereby corrected as shown below:

In the Claims

Column 12, Line 2, Claim 1, delete "plurality" and insert -- plurality of --

Signed and Sealed this
Sixth Day of September, 2022

Katherine Kelly Vidal
*Director of the United States Patent and Trademark Office*